United States Patent [19]

Loew

[11] Patent Number: 4,469,727
[45] Date of Patent: Sep. 4, 1984

[54] AUTOMOTIVE TRIM STRIP WITH EXPANDED PRESSURE SENSITIVE TAPE

[75] Inventor: Theodore Loew, Schenectady, N.Y.

[73] Assignee: The Standard Products Company, Cleveland, Ohio

[21] Appl. No.: 298,911

[22] Filed: Sep. 2, 1981

[51] Int. Cl.³ .............................................. B32B 3/24
[52] U.S. Cl. ..................................... 428/31; 428/136; 428/138; 428/343; 52/716; 293/128
[58] Field of Search ................. 428/31, 131, 134, 135, 428/136, 138, 343, 910; 52/716, 717; 293/126, 128

[56] References Cited

U.S. PATENT DOCUMENTS 2,510,120  6/1950  Leander ........................... 428/343 X
4,010,297  3/1977  Wenrick ............................... 428/31

FOREIGN PATENT DOCUMENTS 756383   9/1956  United Kingdom ................ 156/253
821959  10/1959  United Kingdom ................ 428/134

Primary Examiner—Alexander Thomas
Attorney, Agent, or Firm—Harness, Dickey & Pierce

[57] ABSTRACT

An automotive trim strip for application to the side of a motor vehicle having an expanded pressure sensitive tape on the rear surface thereof to effect adhesion of the trim strip to the motor vehicle. The pressure sensitive tape is provided with laterally spaced, longitudinally extending slits which are laterally expanded to widen the lateral dimension of the tape to reduce the cost and weight thereof and to provide longitudinally extending apertures therein which accommodate undulations in the mounting surface thereby to facilitate bonding of the trim strip to the motor vehicle.

2 Claims, 3 Drawing Figures

U.S. Patent Sep. 4, 1984 4,469,727
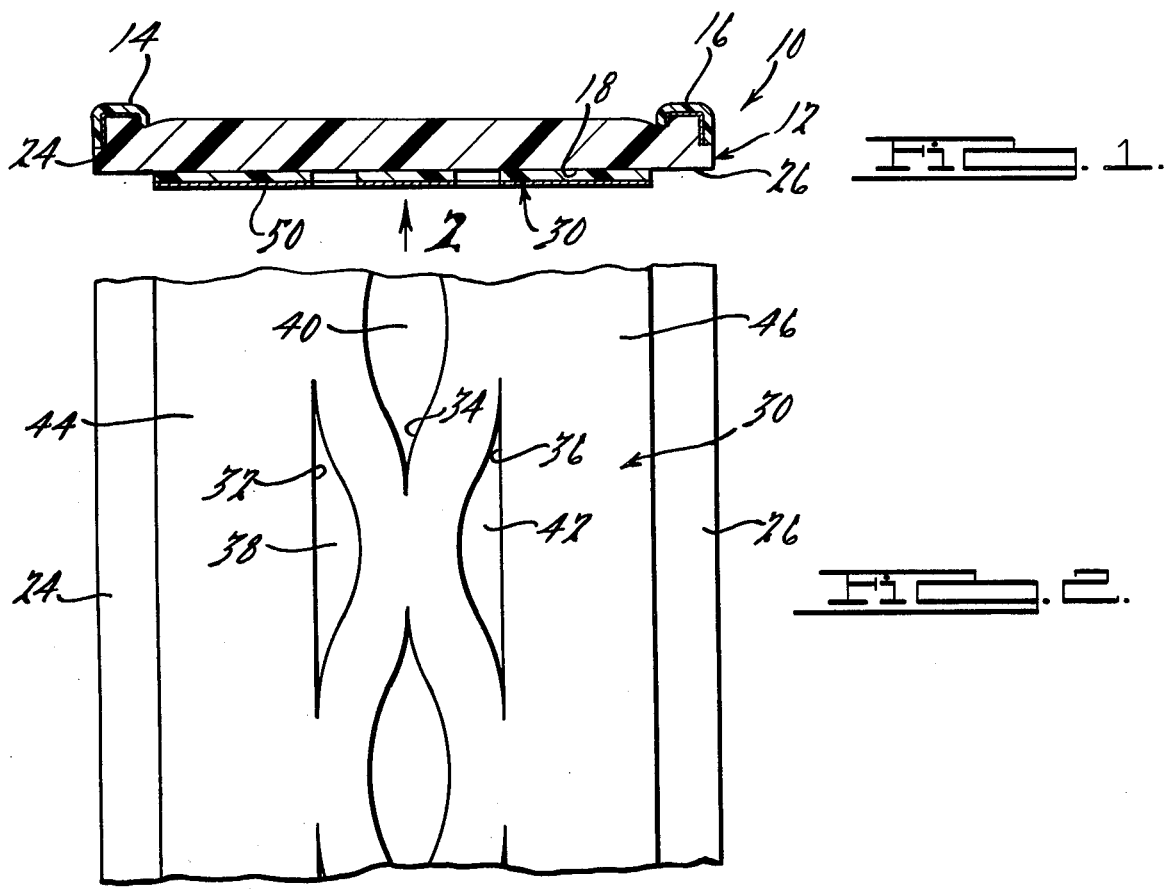
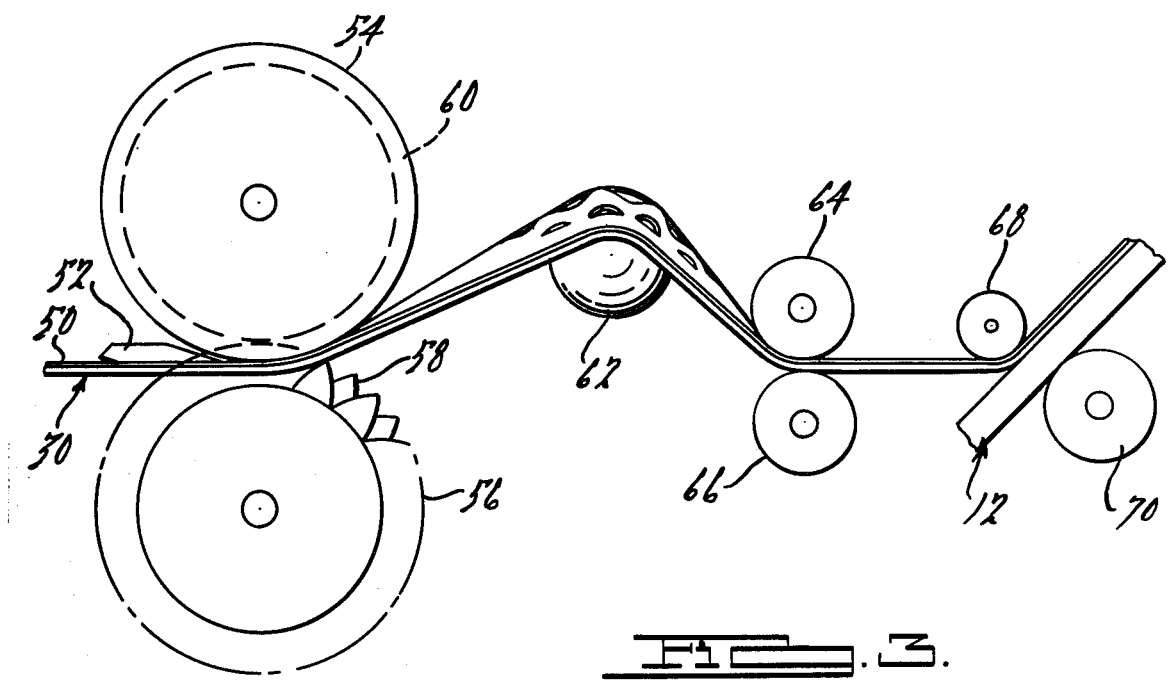

AUTOMOTIVE TRIM STRIP WITH EXPANDED PRESSURE SENSITIVE TAPE

BACKGROUND OF THE INVENTION

Trim strips are now widely used on the sides of motor vehicles both as decorative items and to preclude scoring or chipping of the paint on the side of the motor vehicle. As emphasis has increased on styling of such trim strips, the strips have widened and have more intricate surface detail. Moreover, the strips are required to conform to arcuate panels on the sides of the motor vehicle and to undulate about a horizontal axis in the area of the wheel wells of the vehicle. The advent of such relatively wide trim strips has complicated the manufacture and sale thereof in that the adhesive tape conventionally used to bond the trim strip to the motor vehicle becomes relatively wide and, therefore, relatively expensive. In addition, relatively wide trim strips tend to lose bonding capability over severely undulating surfaces.

SUMMARY OF THE INVENTION

The trim strip of the instant invention comprises a longitudinally extending decorative molding conventionally extruded from vinyl. The trim strip may be provided with one or more metallized surfaces for trim purposes. A relatively wide perforate tape functions to adhere the vinyl extrusion to the side of the motor vehicle. The perforations in the tape provide both a cost savings due to lateral extension of the tape and an improved bonding structure due to an ability to compensate for undulations of the body side panels.

BRIEF DESCRIPTION OF THE DRAWINGS

FIG. 1 is a cross-sectional view of a trim strip in accordance with the instant invention;

FIG. 2 is a view taken in the direction of the arrow 2 of FIG. 1;

FIG. 3 is a schematic view of the manufacturing process of the trim strip of the instant invention.

DETAILED DESCRIPTION OF THE PREFERRED EMBODIMENT

As best seen in FIG. 1 of the drawings, a trim strip 10 comprises a vinyl extrusion 12 having metallized mylar edge portions 14 and 16. A bottom surface 18 of the vinyl extrusion 12 has longitudinally extending edge portions 24 and 26, respectively, that extend laterally beyond the edges of a pressure sensitive adhesive tape 30.

In accordance with the instant invention, and as best seen in FIG. 2 of the drawings, the pressure sensitive tape 30 is provided with a series of longitudinally extending slits 32, 34 and 36 which are laterally expanded, as will be described, to define openings 38, 40 and 42 in the tape 30. Edge portions 44 and 46 of the tape 30 remain intact to provide a continuous adhesive surface adjacent the edge portions 24 and 26 of the vinyl extrusion 12. Lateral expansion of the slits 32, 34 and 36 results in approximately a 20% increase in the lateral dimension of the adhesive tape 30, thereby reducing cost of said strip a corresponding amount. Since the slits 32, 34 and 36 are laterally expanded to form open spaces 38, 40 and 42, an obvious reduction in weight of the adhesive strip 30 is achieved. Moreover, the spaces 38, 40 and 42 in the tape 30 accommodate flexure of the trim strip 10 about both a longitudinal axis and an axis extending normally to the bottom face 18 of the trim strip 10 without buckling or excessive build up of tape.

As best seen in FIG. 3 of the drawings, the pressure sensitive tape 30 is provided with a release film 50 and fed under a guide shoe 52 to a grooved driven wheel 54 and a driven piercing wheel 56. The piercing wheel 56 has a plurality of piercing blades 58 thereon in an array which defines the lateral and longitudinal spacing of the slits 32, 34 and 36. The blades 58 slit the tape 30 longitudinally thereof and extend into complementary grooves 60 in the wheel 54.

As best seen in FIG. 2 of the drawings, the slit pattern produced by the grooved and piercing wheels 54 and 56 comprises the laterally spaced slits 32 and 36 and a longitudinally spaced slit 34 equidistant therebetween. End portions of the slits 32 and 36 overlap the end portions of the slit 34 to facilitate expansion of the tape 30 into a lattice configuration as seen in FIG. 2.

Expansion of the slits 32, 34 and 36 to form slots 38, 40 and 42, respectively, is achieved by a spherical spreader roll 62 over which the tape 30 passes under tension. Tension on the tape 30 is achieved, as well as flattening of the tape to a condition suitable for bonding to the vinyl extrusion 12, by a pair of driven flattening rolls 64 and 66. The tape 30 is fed from the flattening rolls 64 and 66 under an idler roll 68 for lamination to the vinyl extrusion 12 which is fed between the idler roll 68 and back-up roll 70.

From the foregoing, it should be apparent that both piercing, expansion and application of the tape 30 to the vinyl extrusion 12 is a continuous operation which adds a minimum of cost thereto but achieves a significant cost saving in combination with exhibiting an improved mechanical characteristic.

While the preferred embodiment of the invention has been disclosed, it will be appreciated that the invention is susceptible to modification without departing from the scope of the following claims.

What is claimed is:

1. A vehicle trim strip comprising a vinyl extrusion and an expanded adhesive strip on a surface thereof, said expanded adhesive strip comprising a plurality of laterally spaced longitudinally extending slots having a substantial lateral dimension, said laterally-spaced slots overlapping one another longitudinally of said trim strip to provide angularly related connecting portions of said adhesive strip on opposite sides of the longitudinally spaced slots, said plurality of slots further being laterally spaced for at least one longitudinally-extending side edge of said adhesive strip to provide at least one longitudinally-extending continuous region of said adhesive strip of a width greater than said angularly related connecting portions adjacent at least one longitudinally side edge of the vehicle trim strip, said slots accommodating flexure of the vehicle trim strip as it is adhesively mated with the contours of a vehicle to which it is applied.

2. A vehicle trim strip according to claim 1, wherein said plurality of slots are disposed in a laterally medial portion of said adhesive strip to provide one of said longitudinally-extending continuous regions of said adhesive strip adjacent each of said longitudinally-extending side edges of the vehicle trim strip.

* * * * *